US012626955B2

(12) United States Patent
Zhang et al.

(10) Patent No.: US 12,626,955 B2

(45) Date of Patent: May 12, 2026

(54) ELECTROLYTES FOR LOW TEMPERATURE LITHIUM BATTERIES

(71) Applicant: UCHICAGO ARGONNE, LLC, Chicago, IL (US)

(72) Inventors: Zhengcheng Zhang, Naperville, IL (US); Mingfu He, Palos Park, IL (US); Qian Liu, Darien, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 495 days.

(21) Appl. No.: 18/139,119

(22) Filed: Apr. 25, 2023

(65) Prior Publication Data

US 2024/0363900 A1 Oct. 31, 2024

(51) Int. Cl.

| | |
|---|---|
| ***H01M 10/0567*** | (2010.01) |
| ***H01M 4/505*** | (2010.01) |
| ***H01M 4/525*** | (2010.01) |
| ***H01M 4/583*** | (2010.01) |
| ***H01M 10/0525*** | (2010.01) |
| ***H01M 10/0568*** | (2010.01) |
| ***H01M 10/0569*** | (2010.01) |
| ***H01M 10/44*** | (2006.01) |
| ***H01M 50/46*** | (2021.01) |

(52) U.S. Cl.

CPC ....... *H01M 10/0567* (2013.01); *H01M 4/505* (2013.01); *H01M 4/525* (2013.01); *H01M 4/583* (2013.01); *H01M 10/0525* (2013.01); *H01M 10/0568* (2013.01); *H01M 10/0569* (2013.01); *H01M 10/443* (2013.01); *H01M 50/46* (2021.01); *H01M 2300/0034* (2013.01); *H01M 2300/0051* (2013.01)

(58) Field of Classification Search

CPC .. H01M 10/0567; H01M 50/46; H01M 4/505; H01M 4/525; H01M 4/583; H01M 10/0525; H01M 10/0568; H01M 10/0569; H01M 10/443; H01M 2300/0034; H01M 2300/0051

USPC .......................................................... 429/188

See application file for complete search history.

(56) References Cited

U.S. PATENT DOCUMENTS

| | | | | |
|---|---|---|---|---|
| 8,748,046 | B2 | 6/2014 | Smart et al. | |
| 2014/0302401 | A1* | 10/2014 | Burkhardt | H01M 4/505 429/333 |
| 2015/0044578 | A1* | 2/2015 | Kourtakis | H01M 10/0525 252/182.1 |
| 2016/0149263 | A1* | 5/2016 | Hallac | H01M 10/0568 429/163 |
| 2020/0335825 | A1* | 10/2020 | Hancock | H01M 10/0567 |
| 2022/0352521 | A1* | 11/2022 | Mikhaylik | H01M 4/0404 |
| 2023/0026621 | A1* | 1/2023 | Chen | H01M 10/0567 |

FOREIGN PATENT DOCUMENTS

| | | | | |
|---|---|---|---|---|
| CN | 112421185 | A * | 2/2021 | H01M 10/0525 |
| JP | 2019087530 | A * | 6/2019 | H01M 2/16 |
| JP | 7065013 | B2 | 5/2022 | |
| WO | WO-2018011062 | A2 * | 1/2018 | H01M 4/131 |
| WO | WO-2021/121222 | A1 | 6/2021 | |

OTHER PUBLICATIONS

Shitu Yang et al., "2,2,2-Trifluoroethyl trifluoroacetate as effective electrolyte additive for uniform Li deposition in lithium metal batteries." Chemical Engineering Journal 435, pp. 1-7. (Year: 2022).*

Cho, Y.G., et al., Energy Environ. Sci., 7, pp. 1737-1743 (2014).

Smart, M.C., et al., "Electrolytes for Low-Temperature Lithium Batteries Based on Ternary Mixtures of Aliphatic Carbonates," J. Electrochem. Soc., 146, pp. 486-492 (1999).

Smart, M.C., et al., "Ester and Carbonate-Based Low Temperature Electrolytes in High Specific Energy and High Power 18650 Li-Ion Cells for Future NASA Missions," ECS Meet. Abstr. MA2020-01, pp. 1-5 (2020).

Zhang, S.S., et al., "A new approach toward improved low temperature performance of Li-ion battery," Electrochem. Commun., 4, pp. 928-932 (2002).

Zhang, S.S., et al., "Effect of propylene carbonate on the low temperature performance of Li-ion Cells," J. Power Sources, 110, pp. 216-221 (2002).

* cited by examiner

*Primary Examiner* — Patricia L. Hailey

(74) *Attorney, Agent, or Firm* — Foley & Lardner LLP

(57) ABSTRACT

An electrochemical cell configured to operate at low temperatures includes a cathode comprising a cathode active material, an anode comprising an anode active material, a separator disposed between the cathode and the anode, and an electrolyte. The electrolyte includes a fluorinated cyclic carbonate, a solid electrolyte interphase (SEI)-forming additive salt, a metal fluorophosphate salt, and a fluorinated organic compound.

8 Claims, 7 Drawing Sheets

ELECTROLYTES FOR LOW TEMPERATURE LITHIUM BATTERIES

GOVERNMENT RIGHTS

The United States Government has rights in this invention pursuant to Contract No. DE-AC02-06CH11357 between the U.S. Department of Energy and UChicago Argonne, LLC, representing Argonne National Laboratory.

FIELD

The present technology is generally related to rechargeable electrochemical cells, and more specifically is related to operating rechargeable electrochemical cells at low temperatures.

BACKGROUND

Lithium-ion batteries (LIBs) are exploited in many portable electronics because of high energy density and high power density (lending long operation time) and cyclability (lending long life span). Moreover, LIBs are now being used widely in electric vehicles. However, the adoption of LIB technology has been constrained by the poor performance of conventional LIBs at low temperatures (i.e from about 0° C. to about −50° C.). This poor performance impacts the ability to use LIBs in certain regions and/or seasons. Therefore, there is need to develop LIBs with adequate low temperature performance.

SUMMARY

One of the reasons for the poor performance of conventional LIBs at low temperature is a result of the conventional electrolyte. Conventional electrolytes typically include a large amount ethylene carbonate (EC) solvent, which impairs LIB performance at low temperature. At room temperature, EC helps facilitate the formation of a stable solid-electrolyte-interphase (SEI) layer. At low temperatures, LIBs with EC-based electrolytes suffer from sharp drops in capacity and rate capability and severe degradation at low temperatures.

Furthermore, electrolytes containing a high proportion of EC tend to freeze at low temperatures below −20° C. because EC has a high melting point (34° C.). To address the problem of EC freezing, tertiary or quaternary carbonate systems with a low portion of EC have been proposed, but these systems still suffered from poor rate capability at low temperatures.

In one aspect, an electrochemical cell is provided comprising a cathode comprising a cathode active material; an anode comprising an anode active material; a separator disposed between the cathode and the anode; and an electrolyte. The electrolyte comprises a fluorinated cyclic carbonate; a solid electrolyte interphase (SEI)-forming additive salt, where the SEI is a layer of material that forms between the anode and the electrolyte produced by breakdown of electrolyte compounds during electrochemical operation of the electrochemical cell; a metal fluorophosphate salt; and a fluorinated compound represented by Formula I, Formula II, Formula III, Formula IV or a mixture of any two or more thereof:

Formula I

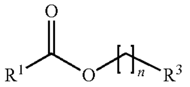

-continued

Formula II

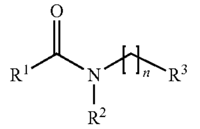

Formula III

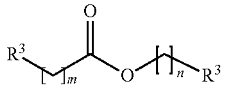

Formula IV

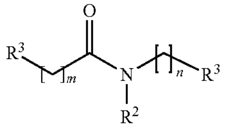

In any of the compounds represented by Formula I, II, III, or IV, $R^1$ is a C1-C6 alkyl group; $R^2$ is a C1-C6 alkyl group; $R^3$ is F or a fluorinated C1-C5 alkyl group; m is 1, 2, 3, or 4; and n is 1, 2, 3, or 4.

In some embodiments, the fluorinated cyclic carbonate may be present in the electrolyte in a concentration of about 3% v/v to about 20% v/v. The fluorinated cyclic carbonate may be present in the electrolyte in a concentration of about 5% v/v to about 15% v/v. The SEI-forming additive salt may be present in the electrolyte in a concentration of about 0.03 M to about 0.2 M. The SEI-forming additive salt may be present in the electrolyte in a concentration of about 0.05 M to about 0.15 M. The fluorinated compound may be represented by Formula V:

Formula V

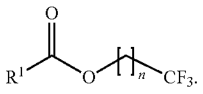

The fluorinated compound may be represented by Formula VI:

Formula VI

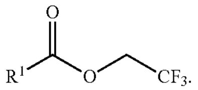

The fluorinated compound may be represented by Formula VII:

Formula VII

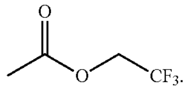

The fluorinated cyclic carbonate may be 4-fluoro-1,3-dioxolan-2-one (FEC). The fluorinated cyclic carbonate may be 4,5-difluoro-1,3-dioxolan-2-one (DFEC). The SEI-forming additive salt may be a difluoro(oxalato)borate (DFOB) salt. The electrochemical cell may be a lithium secondary battery, the metal fluorophosphate salt may be a lithium hexafluorophosphate salt, and the SEI-forming additive salt may be a lithium difluoro(oxalato)borate salt (LiDFOB). $R^1$ may be $-CH_3$, $-CH_2CH_3$, $-CH_2CH_2CH_3$, or $-CH_2CH_2CH_2CH_3$. $R^2$ may be $-CH_3$, $-CH_2CH_3$, $-CH_2CH_2CH_3$, or $-CH_2CH_2CH_2CH_3$. $R^3$ may be $-F$, $-CF_3$, $-CH_2F$, $-CHF_2$, $-CH_2CF_3$, or $-CH_2CF_2H$.

In an aspect, a method of cycling an electrochemical cell is provided. The method comprises operating the electrochemical cell at a temperature of about −40° C. to about −20° C.; wherein operating comprises the electrochemical cell having a capacity retention of at least 90% over 300 electrochemical cycles. The electrolyte in the electrochemical cell includes any of the electrolytes disclosed here.

In some embodiments, the electrochemical cell may be a lithium secondary battery. The lithium secondary battery may include an anode comprising graphite and a cathode comprising $LiNi_{0.6}Mn_{0.2}Co_{0.2}O_2$ (NMC622). Operating the lithium secondary battery may include charging and discharging the lithium secondary battery at a current of C/3 in a voltage window of 2.7 V vs $Li/Li^+$ to 4.4 V vs $Li/Li^+$.

In an aspect, an electrolyte is provided. The electrolyte includes a lithium hexafluorophosphate salt, 4-fluoro-1,3-dioxolan-2-one (FEC), a lithium difluoro(oxalato)borate salt (LiDFOB), and a fluorinated compound represented by Formula VII:

Formula VII

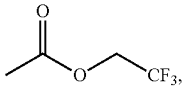

wherein the electrolyte has an ionic conductivity of at least 2 mS $cm^{-1}$ at a temperature of about −20° C. to about −40° C.

DETAILED DESCRIPTION

Figure 1:
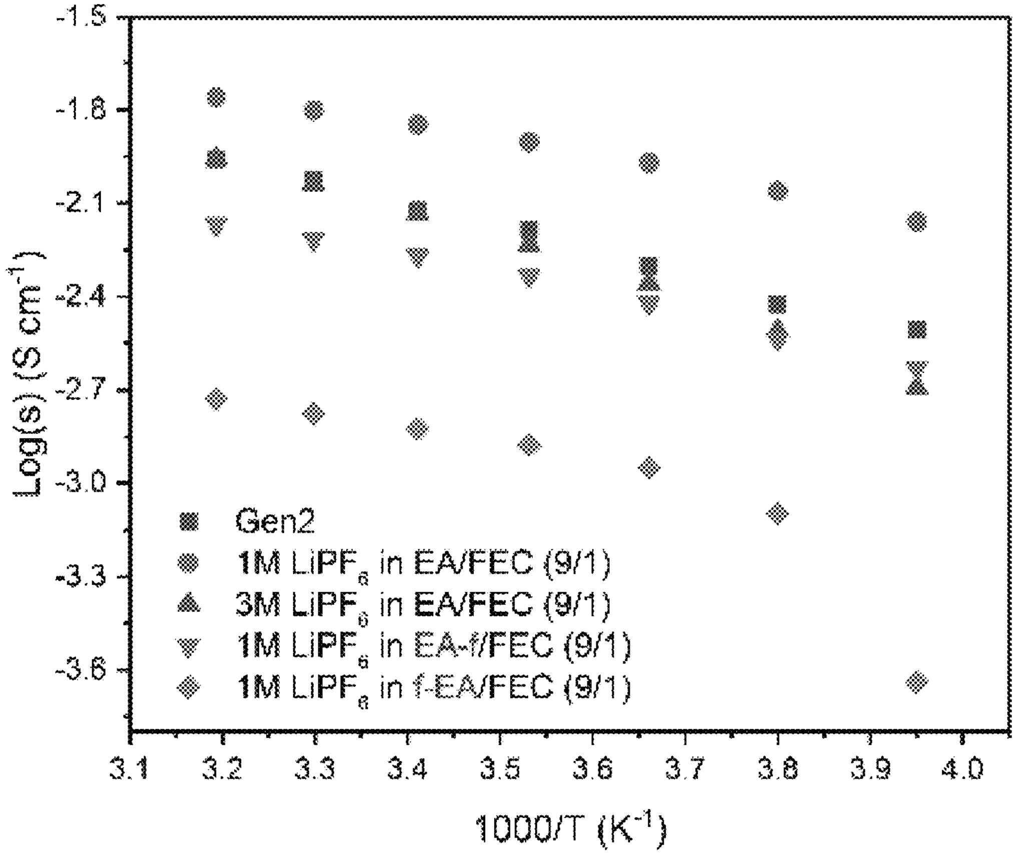
FIG. 1 is a graph of ionic conductivities of different electrolytes at different temperatures.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In general, "substituted" refers to an alkyl, alkenyl, alkynyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Alkyl groups may be substituted or unsubstituted. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a perhaloalkyl group.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

Alkenyl groups are straight chain, branched or cyclic alkyl groups having 2 to about 20 carbon atoms, and further including at least one double bond. In some embodiments alkenyl groups have from 1 to 12 carbons, or, typically, from 1 to 8 carbon atoms. Alkenyl groups may be substituted or unsubstituted. Alkenyl groups include, for instance, vinyl, propenyl, 2-butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e., alkenyl groups with two points of attachment, include, but are not limited to, $CH—CH{=}CH_2$, $C{=}CH_2$, or $C{=}CHCH_3$.

As used herein, "aryl", or "aromatic," groups are cyclic aromatic hydrocarbons that do not contain heteroatoms. Aryl groups include monocyclic, bicyclic, and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. The phrase "aryl groups" includes groups containing fused rings, such as fused aromatic-aliphatic ring systems (e.g., indanyl, tetrahydronaphthyl, and the like). Aryl groups may be substituted or unsubstituted.

As used herein, "low temperature," includes a range of temperatures from about 0° C. or lower. Low temperature may include a range of about 0° C. to about −50° C., about 0° C. to about −20° C., about −10° C. to about −40° C., or about −20° C. to about −40° C., and any value there between.

Disclosed herein are electrochemical cell electrolytes that improve upon ionic conductivity, cycling stability, coulombic efficiency, and SEI formation, compared to conventional electrolytes, when operated at low temperatures as low as about −40° C. The electrolytes include one or more fluorinated linear organic solvents.

The position and degree of fluorination in the organic solvent in the electrolyte impacts the performance of the electrolyte operated at low temperatures. Without being bound by any theory, the position of the fluorine group with respect to the ester group or acetate group and/or the degree of fluorination (i.e., the number of fluorine groups present in the compound) may impose an effect on the electron-withdrawing nature of the ester group or acetate group, the atomic charge of the ester group or acetate group, the binding energy of the ester group or acetate group to the charge carrier (e.g., $Li^+$ in a lithium-ion battery, $Na^+$ in a sodium-ion battery, etc.), the ionic conductivity of the charge carrier in the solvent, and/or the charge carrier solubility in the solvent at low temperatures. Specifically, a fluorine group position closer to the C═O group in the ester group or acetate group may impose a greater electron-withdrawing effect, resulting in a lower atomic charge, lower binding energy to the charge carrier, lower ionic conductivity, and poor solubility at low temperatures. Similarly, a greater degree of fluorination (i.e., a greater number of fluorine substitutions) in the compound imposes a greater electron-withdrawing effect, resulting in a lower atomic charge, lower binding energy to the charge carrier, lower ionic conductivity, and poor solubility at low temperatures. The electrolytes include solvent compounds with fluorination positions and degrees selected to balance the trade-offs of charge carrier desolvation energy and ionic conductivity at low temperature.

In one aspect, an electrolyte is provided that includes a fluorinated linear organic solvent compound as represented by Formula I, II, III, IV, or a mixture of any two or more thereof:

Formula I

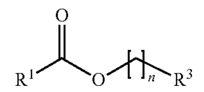

Formula II

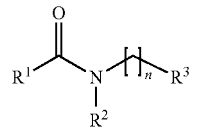

Formula III

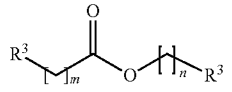

Formula IV

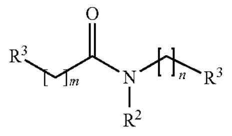

In Formula I, II, III, and/or IV, $R^1$ and $R^2$ may be individually H, F, alkyl, alkenyl, alkynyl, fluorinated alkyl, fluorinated alkenyl, or fluorinated alkynyl. In any embodiment, $R^1$ and $R^2$ may be C1-C20 alkyl group, a C1-C10 alkyl group, a C1-C6 alkyl group, or a C1-C4 alkyl group. In some embodiments, $R^1$ is an alkyl, alkenyl, or alkynyl, and excludes any fluorine groups. In some embodiments, $R^2$ is an alkyl, alkenyl, or alkynyl, and excludes any fluorine groups. In some embodiments, both $R^1$ and $R^2$ are individually alkyl, alkenyl, or alkynyl, and excludes any fluorine groups. As an example, in any embodiment, $R^1$ and $R^2$ may be individually $—CH_3$, $—CH_2CH_3$, $—CH_2CH_2CH_3$, or $—CH_2CH_2CH_2CH_3$.

In Formula I, II, III, and/or IV, $R^3$ is F, fluorinated alkyl, fluorinated alkenyl, or fluorinated alkynyl. As an example, in any embodiment, $R^3$ may be $—F$; $—CF_3$; $—CH_2F$; $—CHF_2$; $—CH_2CF_3$; $—CH_2CF_2H$; $—CH_2CH_2F$; $—CF_2CF_3$; $—CF_2CHF_2$; $—CF_2CH_3$; $—CF_2CH_2F$; $—CHFCF_3$;

—$CHFCHF_2$; —$CHFCH_3$; —$CHFCH_2F$; —$CF(CF_3)_2$; —$CH(CF_3)_2$; —$CF_2CF_2CF_3$; —$CF_2CF_2CHF_2$; —$CF_2CF_2CH_3$; —$CF_2CF_2CH_2F$; —$CH_2CF_2CF_3$; —$CH_2CF_2CHF_2$; —$CH_2CF_2CH_3$; —$CH_2CF_2CH_2F$; —$CHFCF_2CF_3$; —$CHFCF_2CHF_2$; —$CHFCF_2CH_3$; —$CHFCF_2CH_2F$; —$CF_2CH_2CF_3$; —$CF_2CH_2CHF_2$; —$CF_2CH_2CH_3$; —$CF_2CH_2CH_2F$; —$CF_2CHFCF_3$; —$CF_2CHFCHF_2$; —$CF_2CHFCH_3$; —$CF_2CHFCH_2F$; —$CHFCHFCF_3$; —$CHFCHFCHF_2$; —$CHFCHFCH_3$; —$CHFCHFCH_2F$; $CH_2CH_2CF_3$; —$CH_2CH_2CHF_2$; —$CH_2CH_2CH_2F$; —$CF_2CF_2CF_2CF_3$; —$CF_2CF_2CF_2CH_3$; —$CF_2CF_2CF_2CHF_2$; —$CF_2CF_2CF_2CH_2F$; —$CH_2CF_2CF_2CF_3$; —$CH_2CF_2CF_2CH_3$; —$CH_2CF_2CF_2CHF_2$; —$CH_2CF_2CF_2CH_2F$; —$CHFCF_2CF_2CF_3$; —$CHFCF_2CF_2CH_3$; —$CHFCF_2CF_2CHF_2$; —$CHFCF_2CF_2CH_2F$; —$CF_2CH_2CF_2CF_3$; —$CF_2CH_2CF_2CH_3$; —$CF_2CH_2CF_2CHF_2$; —$CF_2CH_2CF_2CH_2F$; —$CF_2CHFCF_2CF_3$; —$CF_2CHFCF_2CH_3$; —$CF_2CHFCF_2CHF_2$; —$CF_2CHFCF_2CH_2F$; —$CHFCHFCF_2CF_3$; —$CHFCHFCF_2CH_3$; —$CHFCHFCF_2CHF_2$; —$CHFCHFCF_2CH_2F$; —$CH_2CH_2CF_2CF_3$; —$CH_2CH_2CF_2CH_3$; —$CH_2CH_2CF_2CHF_2$; —$CH_2CH_2CF_2CH_2F$; —$CF_2CF_2CF_2CF_2CF_3$; —$CH_2CF_2CF_2CF_2CF_3$; —$CF_2CF_2CF_2CF_2CHF_2$; or —$CH_2CF_2CF_2CF_2CHF_2$. In an embodiment, $R^3$ is —$CF_3$.

In Formula I, II, III, and/or IV, m is 1, 2, 3, 4, 5, 6, 7, 8, 9, 10, or 11. For example, in any embodiment, m may be 1, 2, 3, or 4. In Formula I, II, III, and/or IV, n is 1, 2, 3, 4, 5, 6, 7, 8, 9, 10, or 11. For example, in any embodiment, n may be 1, 2, 3, or 4.

In an embodiment, the compound of Formula I has an $R^1$ that is —$CH_3$, —$CH_2CH_3$, —$CH_2CH_2CH_3$, or —$CH_2CH_2CH_2CH_3$; $R_3$ that is —$CF_3$; and n that is 1, 2, 3, or 4. In an embodiment, the compound of Formula I has an $R^1$ that is —$CH_3$, $R_3$ that is —$CF_3$; and n that is 1.

In an embodiment, the compound of Formula II has an $R^1$ and $R^2$ that are individually —$CH_3$, —$CH_2CH_3$, —$CH_2CH_2CH_3$, or —$CH_2CH_2CH_2CH_3$; $R_3$ that is —$CF_3$; n that is 1, 2, 3, or 4; and m that is 1, 2, 3, or 4. In an embodiment, the compound of Formula II has an $R^1$ and $R^2$ that are individually —$CH_3$; $R_3$ that is —$CF_3$; n that is 1; and m that is 1.

The electrolytes further include a charge carrier salt. The charge carrier salt may include metal fluorophosphates, metal fluoroborates, metal 4,5-dicyano-2-(trifluoromethyl) imidazole, and/or metal 4,5-dicyano-2-methylimidazole. Where the electrochemical cell is a lithium-ion battery or a sodium-ion battery, the charge carrier salt may be an alkali metal salt such as a lithium salt or a sodium salt. Where the salt is a lithium salt, it may be selected from, but not limited to, lithium alkyl fluorophosphates; lithium alkyl fluoroborates; lithium 4,5-dicyano-2-(trifluoromethyl)imidazole; lithium 4,5-dicyano-2-methylimidazole; trilithium 2,2',2''-tris(trifluoromethyl)benzotris(imidazolate); $LiN(CN)_2$; $Li(CF_3CO_2)$; $Li(C_2F_5CO_2)$; $LiCF_3SO_3$; $LiCH_3SO_3$; $LiN(SO_2CF_3)_2$; $LiN(SO_2F)_2$; $LiC(CF_3SO_2)_3$; $LiN(SO_2C_2F_5)_2$; $LiClO_4$; $LiBF_4$; $LiAsF_6$; $LiPF_6$; $LiBF_2(C_2O_4)$, $LiB(C_2O_4)_2$, $LiPF_2(C_2O_4)_2$, $LiPF_4(C_2O_4)$, $LiAsF_6$, $LiN(SO_2CF_3)_2$, $LiN(SO_2F)_2$, $Li_2(B_{12}X_{12-p}H_p)$; $Li_2(B_{10}X_{10-p'}H_{p'})$; or a mixture of any two or more thereof, wherein X is independently at each occurrence a halogen, p is 0, 1, 2, 3, 4, 5, 6, 7, 8, 9, 10, 11, or 12, and p' is 0, 1, 2, 3, 4, 5, 6, 7, 8, 9, or 10. In some embodiments, the charge carrier salt may be $LiPF_6$, $LiBF_4$, $LiN(SO_2CF_3)_2$, or $LiN(SO_2F)_2$. Where the charge carrier salt is a sodium salt any of the above may be used as the sodium salt instead of the lithium salt. The charge carrier salt may be present in the electrolyte at any amount including from about 0.5 M to 3 M, and any value there between. This may include a concentration from about 1 M to about 2 M.

The electrolytes may further include an additive that aids in forming the solid electrolyte interphase (SEI) at low temperature. The SEI is a layer of material that forms between the anode and the electrolyte produced by breakdown of electrolyte compounds during electrochemical operation of the electrochemical cell. The additive may include an additive salt and/or an organic additive. Illustrative additive salts include, but are not limited to, a difluoro (oxalato)borate (DFOB, formula $BF_2(C_2O_4)_2^-$) salt; bis(oxalate)borate (BOB, formula $B(C_2O_4)_2^-$) salt; tris (trimethylsilyl) borate (TMSB, formula $[(CH_3)_3SiO]_3B$); tetrafluoroborate ($BF_4^-$) (where the additive salt is not also the charge carrier salt). Illustrative organic additives include, but are not limited to, 1,3-propane sultone (formula $C_3H_6O_3S$); ethylene carbonate (EC, formula $(CH_2O)_2CO$); or vinylene carbonate (VC, formula $C_3H_2O_3$). In any embodiment, additives may include 4-fluoro-1,3-dioxolan-2-one (FEC, formula $C_3H_3FO_3$); difluoroethylene carbonate (DFEC, formula $C_3H_2F_2O_3$); and/or 4-(trifluoromethyl)-1,3-dioxolan-2-one (also called trifluoropropylene carbonate, TFPC, formula $C_4H_3F_3O_3$). Where the electrochemical cell is a lithium-ion battery, the additives may include lithium salts, including lithium difluoro(oxalato)borate (LiDFOB, formula $LiBF_2(C_2O_4)_2$) salt, lithium bis(oxalate)borate (LiBOB, formula $LiB(C_2O_4)_2$) salt, lithium tetrafluoroborate ($LiBF_4$), and/or any other additive listed above. Where the electrochemical cell is a sodium-ion battery, the additives may include any of the above lithium salt additives used as sodium salts instead of lithium salts and/or any of the organic additives. One additive or a mixture of two or more additives may be included in the electrolytes. The additives may be present in the electrolyte at any amount including from about 0.03 M to about 0.5 M, and any value there between. This may include from about 0.03 to about 0.2, and from about 0.05 M to about 0.15 M.

The electrolytes may further include a fluorinated cyclic carbonate compound that stabilizes the electrolyte at low temperature. Illustrative fluorinated cyclic carbonate compounds include, but are not limited to, 4-fluoro-1,3-dioxolan-2-one (FEC, formula $C_3H_3FO_3$); difluoroethylene carbonate (DFEC, formula $C_3H_2F_2O_3$); and/or 4-(trifluoromethyl)-1,3-dioxolan-2-one (also called trifluoropropylene carbonate, TFPC, formula $C_4H_3F_3O_3$) (where the fluorinated cyclic carbonate compounds are not also the additive). One fluorinated cyclic carbonate additive or a mixture of two or more fluorinated cyclic carbonate additives may be included in the electrolytes. The fluorinated cyclic carbonate compounds may be present in the electrolyte at any amount including from about 0.03 M to about 0.5 M, and any value there between. This may include from about 0.03 to about 0.2, and from about 0.05 M to about 0.15 M. The fluorinated cyclic carbonate compounds may be present in the electrolyte in concentration of about 3% volume by volume (v/v) to about 20% v/v, including about 5% v/v to about 15% v/v.

In some embodiments, the electrolytes include one or more fluorinated cyclic carbonate compounds but do not include any additive salts. In other embodiments, the electrolytes include one or more additive salts but do not include any fluorinated cyclic carbonate compounds.

In some embodiments, the electrolytes exclude certain compounds that are not suited for operation at low temperature. For example, the electrolytes may exclude non-fluorinated sulfones, fluorinated sulfones, non-fluorinated cyclic carbonates, linear fluorinated carbonates, and/or linear non-fluorinated carbonates. As another example, the electrolytes may exclude all carbonates and/or all sulfones.

In any embodiment, the electrolytes may exclude certain fluorinated linear organic compounds where the position and degree of fluorination in the compounds do not lend a balance of $Li^+$ desolvation energy and ionic conductivity suitable for at low temperature operation. For example, the electrolytes may include fluorinated esters or fluorinated acetates with one or more fluorine substitutions on the side of the —O— group further from the C═O and exclude fluorinated esters or fluorinated acetates with the fluorine substitution on the side of the oxygen in the continuous chain closer to the carbonyl. To illustrate, as an example, the electrolytes may include trifluoroethyl acetate (Formula VII) but exclude ethyl trifluoroacetate and trifluoroethyl trifluoroacetate. As another example, the electrolytes may include fluorinated amides with the fluorine substitution on the side of the nitrogen further from the carbonyl and exclude fluorine substitution on the side of the nitrogen closer to the carbonyl.

In an embodiment, the electrolyte includes a fluorinated linear organic solvent compound as represented by Formula I, II, III, and/or IV, or a mixture of any two or more thereof; a metal fluorophosphate salt; an additive that aids in forming the solid electrolyte interphase (SEI); and a fluorinated cyclic carbonate.

In an embodiment, the electrolyte includes a fluorinated linear organic solvent compound as represented by Formula I, II, III, and/or IV, or a mixture of any two or more thereof; a metal fluorophosphate salt; a DFOB salt; and a fluorinated cyclic carbonate.

In an embodiment, the electrolyte includes a fluorinated linear organic solvent compound as represented by Formula I, II, III, and/or IV, or a mixture of any two or more thereof; a metal fluorophosphate salt; a DFOB salt; and FEC.

In any embodiment, the electrolytes may have an ionic conductivity of at least about 1.5 mS $cm^{-1}$ at a temperature of about 0° C. to about −40° C. This includes having an ionic conductivity of at least 2 mS $cm^{-1}$ at a temperature of about −20° C. ° C. to about −40° C., and an ionic conductivity of at least 2.2 mS $cm^{-1}$ at a temperature of about −20° C. ° C. to about −40° C.

In another aspect, an electrochemical device is provided that includes an anode having an anode active material, a cathode having a cathode active material, a separator between the anode and cathode, and any of the electrolytes described herein. For example, the electrolyte may include any of the compounds of Formula I, II, III, and/or IV, or a mixture of any two or more thereof.

Illustrative cathode active materials may include, but are not limited to, a spinel, a olivine, a carbon-coated olivine, $LiFePO_4$, $LiCoO_2$, $LiNiO_2$, $LiNi_{1-x}Co_yM^4_zO_2$, $LiMn_{0.5}Ni_{0.5}O_2$, $LiMn_{1/3}Co_{1/3}Ni_{1/3}O_2$, $LiMn_2O_4$, $LiFeO_2$, $LiM^4_{0.5}Mn_{1.5}O_4$, $Li_{1+x''}Ni_\alpha Mn_\beta Co_\gamma M^5_{\delta'}O_{2-z''}F_{z''}$, or $VO_2$. In the cathode active materials, $M^4$ is Al, Mg, Ti, B, Ga, Si, Mn, or Co; $M^5$ is Mg, Zn, Al, Ga, B, Zr, or Ti; A is Li, Ag, Cu, Na, Mn, Fe, Co, Ni, Cu, or Zn; $B^1$ is Ti, V, Cr, Fe, or Zr; $0 \leq x \leq 0.3$; $0 \leq y \leq 0.5$; $0 \leq z \leq 0.5$; $0 \leq x'' \leq 0.4$; $0 \leq \alpha \leq 1$; $0 \leq \beta \leq 1$; $0 \leq \gamma \leq 1$; $0 \leq \delta' \leq 0.4$; and $0 \leq z'' \leq 0.4$; with the proviso that at least one of α, β and γ is greater than 0. In some embodiments, the cathode includes $LiFePO_4$, $LiCoO_2$, $LiNiO_2$, $LiNi_{1-x}Co_yM^4_zO_2$, $LiMn_{0.5}Ni_{0.5}O_2$, $LiMn_{1/3}Co_{1/3}Ni_{1/3}O_2$, $LiMn_2O_4$, $LiCr_{0.5}Mn_{1.5}O_4$, $LiCrMnO_4$, $LiFe_{0.5}Mn_{1.5}O_4$, $LiCo_{0.5}Mn_{1.5}O_4$, $LiCoMnO_4$, $LiCoMnO_4$, $LiNi_{0.5}Mn_{1.5}O_4$, $LiNiPO_4$, $LiCoPO_4$, $LiMnPO_4$, $LiCoPO_4F$, $Li_2MnO_3$, $Li_5FeO_4$, and $Li_{x'}(Met)O_2$, wherein Met is a transition metal and $1<x' \leq 2$. In some embodiments, Met is Ni, Co, Mn, or a mixture of any two or more thereof. In some embodiments, Met is a mixture of Ni, Co, and Mn. In some embodiments, the cathode active material may include $LiFePO_4$, $LiCoO_2$, $LiNiO_2$, $LiNi_{1-x}Co_yM^4_zO_2$, $LiMn_{0.5}Ni_{0.5}O_2$, $LiMn_{1/3}Co_{1/3}Ni_{1/3}O_2$, $LiMn_2O_4$, $LiCr_{0.5}Mn_{1.5}O_4$, $LiCrMnO_4$, $LiFe_{0.5}Mn_{1.5}O_4$, $LiCo_{0.5}Mn_{1.5}O_4$, $LiCoMnO_4$, $LiCoMnO_4$, $LiNi_{0.5}Mn_{1.5}O_4$, $LiNiPO_4$, $LiCoPO_4$, $LiMnPO_4$, $LiCoPO_4F$, $Li_2MnO_3$, $Li_5FeO_4$, or $Li_{x'}(Met)O_2$, where Met is a transition metal and $1<x' \leq 2$. Other materials may include metallic or semiconducting particles, or plasmonic particles that generate nascent electric fields when irradiated by white light. In some embodiments, the cathode may include a cathode active material that includes manganese. In such embodiments, the cathode active material may include, but is not limited to $LiMn_{0.5}Ni_{0.5}O_2$, $LiMn_{1/3}Co_{1/3}Ni_{1/3}O_2$, $LiMn_2O_4$, $LiM^4_{0.5}Mn_{1.5}O_4$, $Li_{1+x''}Ni_\alpha Mn_\beta Co_\gamma M^5_{\delta'}O_{2-z''}F_{z''}$, $LiMn_{0.5}Ni_{0.5}O_2$, $LiMn_{1/3}Co_{1/3}Ni_{1/3}O_2$, $LiMn_2O_4$, $LiCr_{0.5}Mn_{1.5}O_4$, $LiCrMnO_4$, $LiFe_{0.5}Mn_{1.5}O_4$, $LiCo_{0.5}Mn_{1.5}O_4$, $LiCoMnO_4$, $LiCoMnO_4$, $LiNi_{0.5}Mn_{1.5}O_4$, $LiMnPO_4$, or $Li_2MnO_3$, where $M^4$ is Al, Mg, Ti, B, Ga, Si, Mn, or Co; $M^5$ is Mg, Zn, Al, Ga, B, Zr, or Ti; $0 \leq x'' \leq 0.4$; $0 \leq \alpha \leq 1$; $0<\beta \leq 1$; $0 \leq \gamma \leq 1$; $0 \leq \delta' \leq 0.4$; $0 \leq z'' \leq 0.4$; and $0 \leq n' \leq 3$. Example cathode materials include, but are not limited to, $LiFePO_4$, $LiFe_xMn_{1-x}PO_4$ ($0 \leq x \leq 1$), and $LiNi_xMn_yCo_{1-x-y}O_2$ (NMC, $0 \leq x \leq 1$, $0 \leq y \leq 1$, $0 \leq x+y \leq 1$).

Illustrative anode materials include metallic anode active materials such as lithium, sodium, or magnesium; sulfur materials; metal oxides such as $TiO_2$ or $Li_4Ti_5O_{12}$; or carbon materials including, but not limited to, synthetic graphite, natural graphite, amorphous carbon, hard carbon, soft carbon, mesocarbon microbeads (MCMB). In any of the above embodiments, the anode may include a graphite material, alloys, intermetallics, silicon, silicon oxides, $TiO_2$ and $Li_4Ti_5O_{12}$, and composites thereof. For example, the anode active material may include a metallic anode material intercalated within a host material, where the metallic anode material includes, but is not limited to, lithium, sodium, or magnesium, and the host material may be an active carbon material including, but not limited to, synthetic graphite, natural graphite, amorphous carbon, hard carbon, soft carbon, mesocarbon microbeads (MCMB). In other embodiments, the metallic anode material includes, but is not limited to, lithium, sodium, or magnesium, and metallic anode material is dispersed in a host material, which may be an alloy, intermetallic, silicon, silicon oxide, $TiO_2$, $Li_4Ti_5O_{12}$, or mixtures of any two or more thereof. In some embodiments, the anode active material is a lithiated carbon material such as lithiated graphite. Example anode materials for the lithium battery include, but are not limited to, Li metal, meso-carbon microbeads, natural graphite, synthetic graphite, soft carbon, hard carbon, and Si-based alloys.

The composite electrolyte, cathodes, and/or anodes of the lithium batteries may also include one or more conductive carbonaceous materials. In some embodiments, the conductive carbonaceous material may be a conductive carbon. Examples of conductive carbons include synthetic graphite, natural graphite, amorphous carbon, hard carbon, soft carbon, acetylene black, mesocarbon microbeads (MCMB), carbon black, Ketjen® black, mesoporous carbon, porous carbon matrix, carbon nanotube, carbon nanofiber, and/or graphene.

The electrochemical cells may also include current collectors. Current collectors for the anode and/or the cathode may include those of copper, stainless steel, titanium, tantalum, platinum, gold, aluminum, nickel, cobalt nickel alloy, highly alloyed ferritic stainless steel containing molybdenum and chromium; or nickel-, chromium-, or molybdenum-containing alloys.

The anodes and cathodes may include one or more binders that retain the electrode active material and other materials in the electrode to the current collector. Illustrative binders include, but are not limited to, polyvinylidene difluoride (PVDF), polyvinyl alcohol (PVA), polyethylene, polystyrene, polyethylene oxide, polytetrafluoroethylene (Teflon), polyacrylonitrile, polyimide, styrene butadiene rubber (SBR), carboxy methyl cellulose (CMC), alginate, gelatin, a copolymer of any two or more such polymers, or a blend of any two or more such polymers.

In another aspect, a method of cycling any of the electrochemical devices described herein at low temperature is provided. The method may include cycling the electrochemical devices at a current from about C/20 to about 6C, including any value there between (e.g., C/10, C/5, C/3, 1C, 2C, 3C, 4C, or 5C). For example, the range of currents may include about C/10 to about 4C. The method may include retaining a capacity and coulombic efficiency of at least about 80% over 300 electrochemical cycles, including at least about 90%, about 95%, and about 98%.

The present invention, thus generally described, will be understood more readily by reference to the following examples, which are provided by way of illustration and are not intended to be limiting of the present invention.

EXAMPLE

Reagents and General Methods

Ethyl acetate (EA), trifluoroethyl acetate (EA-f, Formula VII), ethyl trifluoroacetate (f-EA) and trifluoroethyl trifluoroacetate (f-EA-f) were used as received from commercial suppliers. All solvents used in this study were purified by vacuum distillation and then dried by adding 4 Å molecular sieves before use. Gen 2 electrolyte is 1.2 M $LiPF_6$ in a ratio of ethylene carbonate (EC) to ethyl methyl carbonate (EMC) of 3/7=w/w ratio. The cathode NMC622 was composed of 90 wt % $LiNi_{0.6}Mn_{0.2}Co_{0.2}O_2$, 5 wt % polyvinylidene fluoride binder (PVdF) and 5 wt % C45 conductive carbon cast on an aluminum foil current collector with a mass loading of 9.78 mg/cm$^2$. The graphite anode was composed of 91.83 wt % Superior graphite, 6 wt % PVdF binder, 0.17 wt % oxalic acid additive, and 2 wt % C45 conductive carbon casted on a copper foil with a mass loading of 6.38 mg/cm$^2$. All electrodes were dried at 110° C. under vacuum overnight. Celgard 2500 was used as the separator. The diameters of the cathode, anode, and separator were 14, 15, and 16 mm, respectively.

The electrochemical performance of the electrolytes was evaluated in 2032 coin cells. The full cells were composed of a NMC622 cathode and a graphite anode. Different electrolytes were used in different cells. The cell assembly was conducted in an argon-filled glovebox. Galvanostatic cycling was performed at 2.7 V to 4.4 V following three C/10 formation cycles. Electrochemical impedance spectroscopy (EIS) was operated between 0.01 Hz and 1 MHz with amplitude of 10 mV.

The cycled cells were disassembled in an argon-filled golvebox. The graphite and NMC622 electrodes were obtained at a charged state of 3.7 V after three formation cycles with Gen 2, EA, EA-f, and EA-f with LiDFOB electrolytes. The electrodes cycled with Gen 2 electrolyte were rinsed with dimethyl carbonate and electrodes cycled with EA-based electrolytes were rinsed with EA. The electrodes were characterized after being vacuum dried. X-ray photoelectron spectroscopy (XPS) was conducted in the fixed analyzer transmission mode using an Al Kα radiation source (hv=1486.6 eV, 100 μm beam, 25 W) with $Ar^+$ and electron beam sample neutralization.

Results and Discussion

Fluorinated Ester-Based Electrolytes

Compared to the conventional Gen 2 electrolytes with ethylene carbonate (EC) and ethyl methyl carbonate (EMC) co-solvent (1.2 M $LiPF_6$ in EC/EMC w/w=3/7), the electrolyte for low temperature performance included an ethyl acetate (EA) solvent with fluoroethylene carbonate (FEC) co-solvent. EA solvents may be favorable for low temperature operation because they have low melting points and high ionic conductivities.

Without being bound by any theory, EA solvents may demonstrate tighter binding to $Li^+$ ions in electrolytes compared to EMC solvents due to the lack of electron-withdrawing oxygen atoms in the ester group, resulting in a relatively high desolvation energy. To decrease the desolvation energy, which is one of the limiting factors of $Li^+$ ion kinetics at low temperatures, the terminal methyl group ($-CH_3$) of EA was functionalized with a trifluoro methyl group ($-CF_3$), since the $-CF_3$ group is a strong electron-withdrawing group. In addition, the fluorination enhanced high voltage stability, preventing possible oxidation of hydrogen at high voltage.

In order to investigate the effect of the position and degree of fluorination, different types of fluorinated ester solvents were compared. The different fluorinated ester solvents were trifluoroethyl acetate (EA-f), ethyl trifluoroacetate (f-EA), and trifluoroethyl trifluoroacetate (f-EA-f). The solvents included FEC co-solvent at a concentration of 10 vol % since EA and EA-f solvents alone did not stabilize the SEI layer.

FIG. 1 is a graph of ionic conductivities of the EA electrolytes at different temperatures as compared to conventional Gen 2 electrolyte. Ionic conductivities of different electrolytes at various temperatures were measured by electrochemical impedance spectroscopy (EIS) characterization using bulk electrolytes. EA electrolytes showed higher ionic conductivities compared to Gen 2 electrolyte. Without being bound by any theory, this result may be due to the favorably low viscosity and low ion-pair ratio (high dissociation) of the EA electrolytes. At a higher concentration of $LiPF_6$ in the EA electrolyte, specifically 3 M, the ionic conductivity decreased and a higher activation energy of 8.0 kJ mol$^{-1}$. Without being bound by any theory, this result may be because of the increased ion-pair ratio at the higher salt concentration. EA-f electrolyte had an ionic conductivity slightly less than that of Gen 2 electrolyte. Still the ionic conductivity of EA-f was sufficiently above 2.4 mS cm$^{-1}$ to sustain ion transport at low temperatures. In contrast, f-EA electrolyte had an insufficient ionic conductivity of 1.5 mS cm$^{-1}$ at room temperature and 0.2 mS cm$^{-1}$ at −20° C. $LiPF_6$ salt precipitated out of the EA-f electrolyte at temperatures below −20° C. Without being bound by any theory, this result may indicate that the weak binding energy of fluorinated solvents has a trade-off between ionic conductivity and solvation.

SEI Layers and Interfacial Resistances

Figure 2:
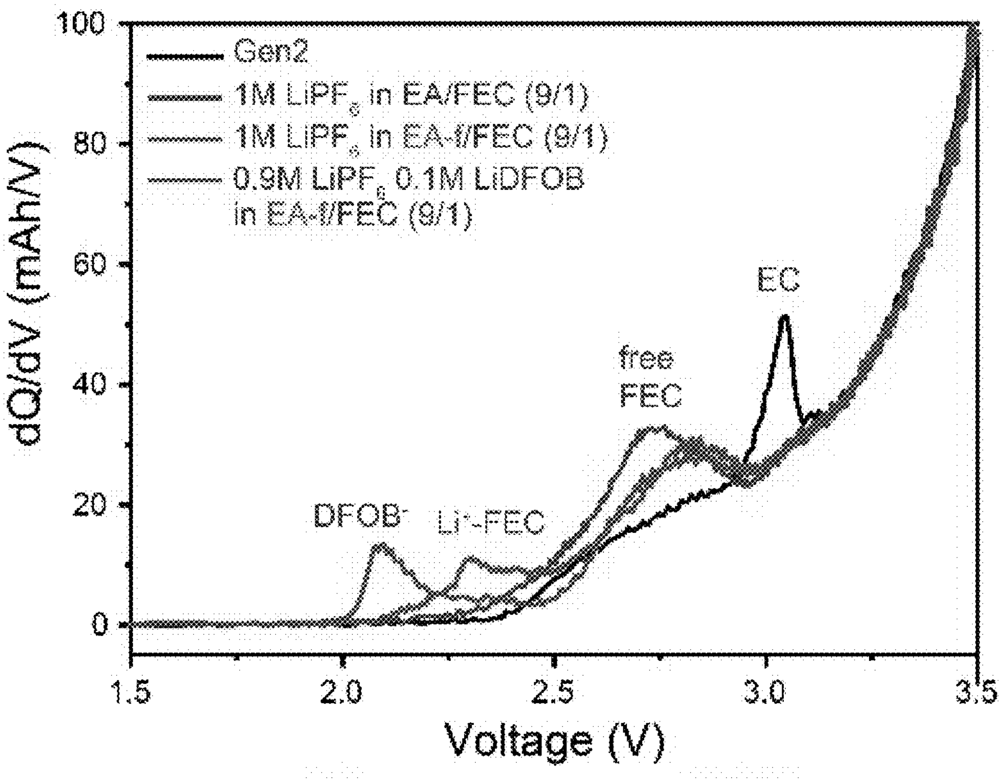
FIG. 2 is a graph of dQ/dV of graphite|NMC622 electrochemical cells with different electrolytes during the first charge.

FIG. 2 is a graph of dQ/dV of graphite|NMC622 electrochemical cells with different electrolytes during the first charge. The EA-f electrolyte included 0.1 M LiDFOB and as an additive to modify the SEI layer, and the optimized electrolyte was 0.9 M $LiPF_6$+0.1 M LiDFOB in EA-f/FEC (9/1) (LiDFOB added EA-f electrolyte). These dQ/dV profiles indicate the manner of SEI layer formation. The electrochemical cell using Gen 2 electrolyte had an EC reduction peak at 3.0 V. While there was a free FEC reduction peak at 2.7 V in EA electrolyte, $Li^+$-coordinated FEC was reduced earlier at 2.3 V in EA-f electrolyte. In the EA-f electrolyte with LiDFOB, $DFOB^-$ was reduced at lower voltage than $Li^+$-coordinated FEC, forming an ion-conductive SEI layer. f-EA solvent was reduced earlier than FEC and showed high peaks at 2.6 V and 2.7 V due to the higher reduction potential.

Figure 3:
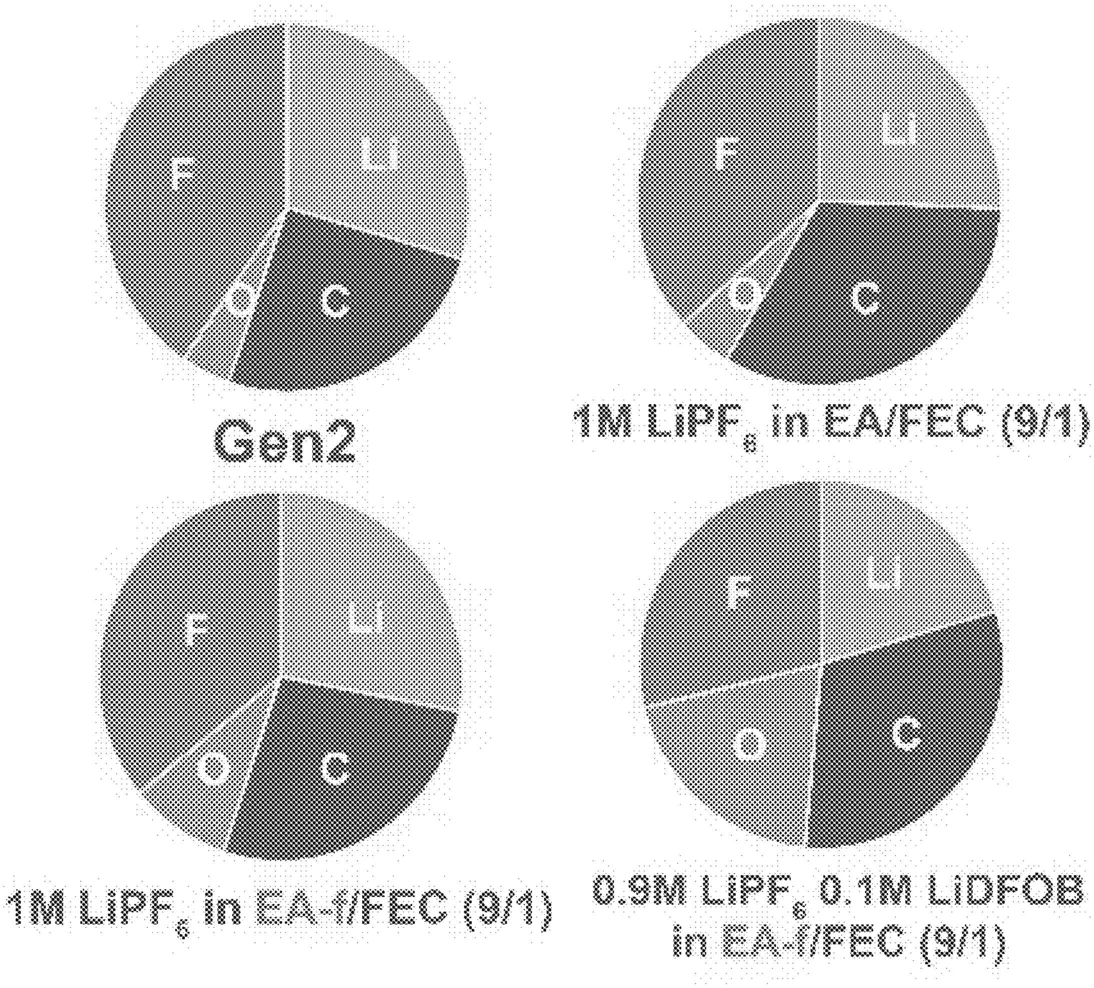
FIG. 3 shows pie graphs of atomic ratios fitted from X-ray photoelectron spectroscopy (XPS) spectra of graphite anodes from graphite|NMC622 electrochemical cells after three formation cycles with different electrolytes.

FIG. 3 shows pie graphs of atomic ratios fitted from X-ray photoelectron spectroscopy (XPS) spectra of graphite anodes from graphite|NMC622 electrochemical cells after three formation cycles with different electrolytes. In order to analyze the composition of the SEI layers, X-ray photoelectron spectroscopy (XPS) characterization of graphite anodes cycled in different electrolytes was conducted after three formation electrochemical cycles. Compared to EA electrolyte, Li and O atomic ratios in EA-f electrolyte were increased, possibly due to the reduction of $Li^+$-coordinated FEC. The anode cycled in EA-f electrolyte with LiDFOB had increased O and C atomic ratios, possibly due to the active reduction of $DFOB^-$. The participation of $Li^+$-coordinated FEC was associated with a large peak indicative of the presence of C═O bonds at 532 eV in the O 1s XPS spectra. In addition, LiDFOB additive further modified the SEI layer with a lower ratio of LiF and greater ratio of organic compounds, including C═O, OCOO, and O—C═O bonds.

Figure 4:
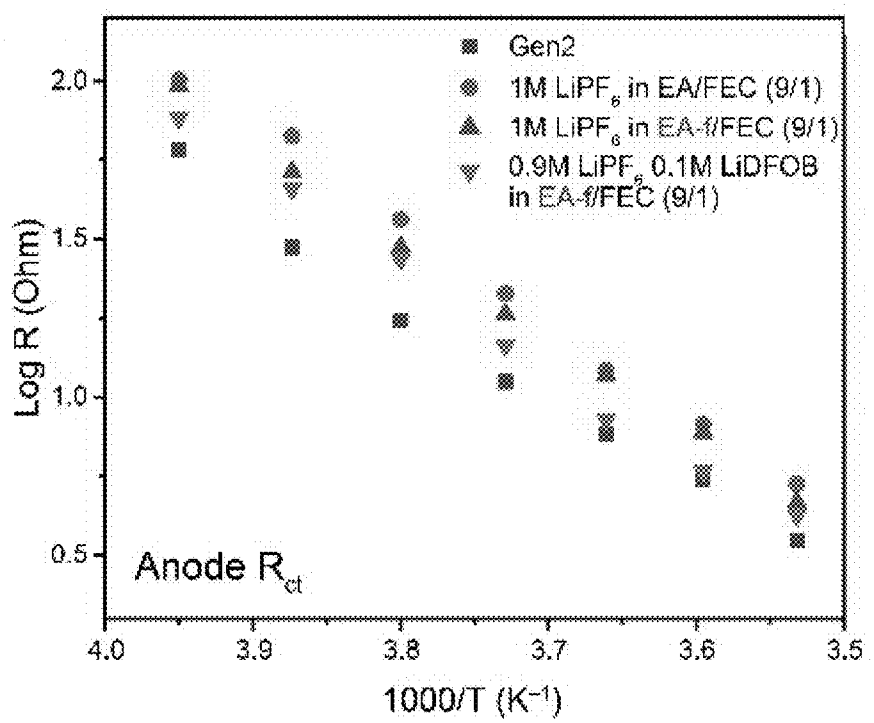
FIG. 4 is an Arrhenius graph of charge transfer resistance at the anode ($R_{ct\text{-}anode}$) fitted from Nyquist plots of graphite|NMC622 electrochemical cells in different electrolytes at different temperatures.

FIG. 4 is an Arrhenius graph of charge transfer resistance at the graphite anode ($R_{ct\text{-}anode}$) fitted from Nyquist plots of graphite|NMC622 electrochemical cells in different electrolytes at different temperatures. Temperature-dependent electrochemical impedance spectroscopy (EIS) data was collected for NMC622/graphite cells with different electrolytes at a charged state of 3.7 V after three formation cycles. This data may indicate the effect on the interfacial resistance of the different electrolyte solvents. The results indicated that as the temperature decreased, the total resistance increased due to the lower thermal energy of $Li^+$ ions for electrochemical reactions. While Gen 2 and EA electrolytes showed larger total resistances at −20° C. of 365Ω and 315Ω, respectively, EA-f electrolyte showed a much lower total resistance of 207Ω at −20° C. f-EA electrolyte had an even higher total resistance at 375Ω at −20° C., possibly due to the low solubility and low ionic conductivity of this solvent at low temperature.

Figure 5:
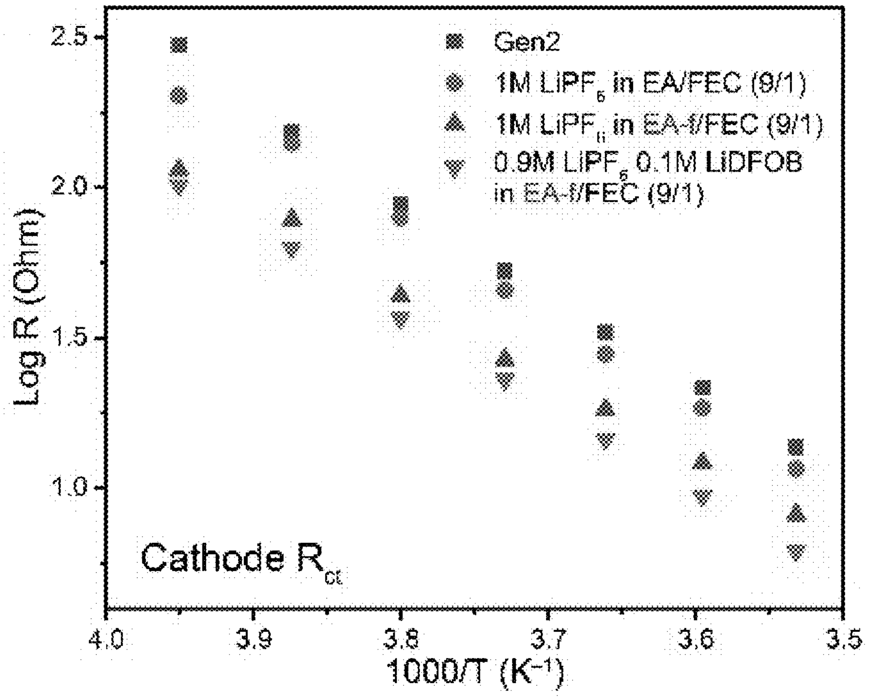
FIG. 5 is an Arrhenius graph of charge transfer resistance at the cathode ($R_{ct\text{-}cathode}$) fitted from Nyquist plots of graphite|NMC622 electrochemical cells in different electrolytes at different temperatures.

FIG. 5 is an Arrhenius graph of charge transfer resistance at the cathode ($R_{ct\text{-}cathode}$) fitted from Nyquist plots of graphite|NMC622 electrochemical cells in different electrolytes at different temperatures. To compare each resistance component contribution, charge transfer resistance was deconvoluted and extracted at the anode ($R_{ct\text{-}anode}$) and at the cathode ($R_{ct\text{-}cathode}$) from the measured data, since those two components are known as limiting factors at low temperatures. In the Arrhenius plot of $R_{ct\text{-}anode}$ shown in FIG. 4, the cell using Gen 2 electrolyte had a lower resistance, possibly due to the ion-conductive SEI layer derived from EC reduction. While the cell using EA electrolyte showed a much higher resistance, the cells using EA-f and EA-f with LiDFOB electrolytes, respectively, showed relatively lower resistances, possibly because of the weaker solvation structure and modified SEI layer. In the Arrhenius plot of $R_{ct\text{-}cathode}$ shown in FIG. 5, the cell using EA electrolyte had similar a resistance to the cell using Gen 2 electrolyte. The cells using EA-f and EA-f with LiDFOB electrolytes, respectively, showed much smaller resistance values.

Electrochemical Performances

Figure 6:
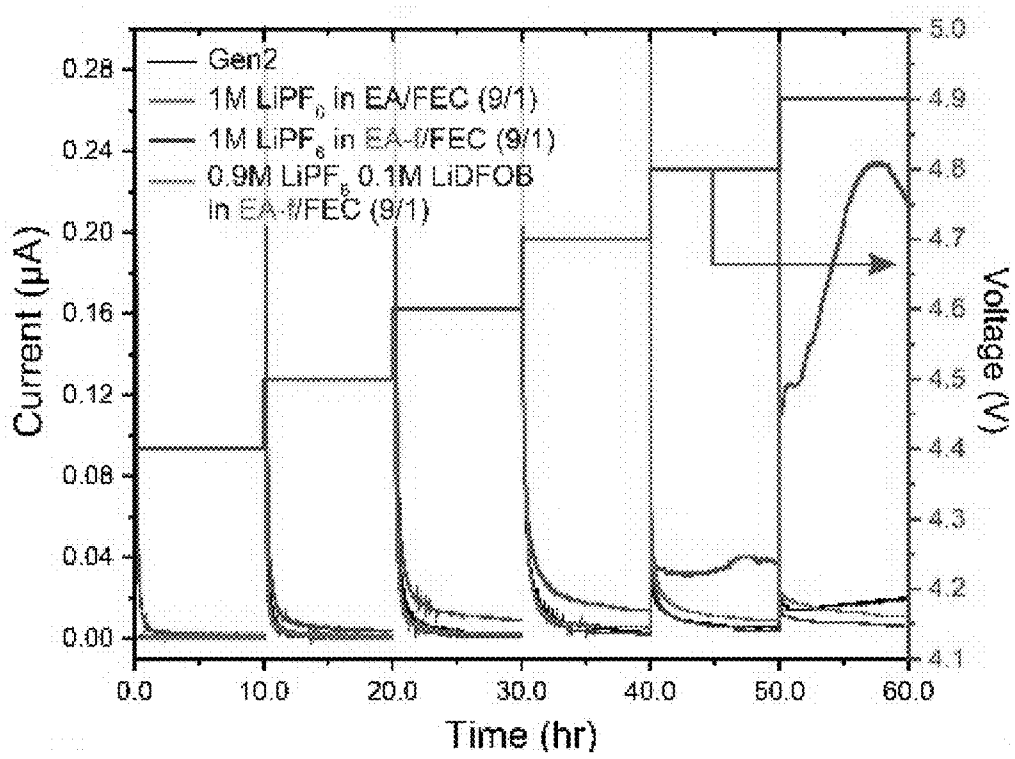
FIG. 6 is a graph of voltage holds of graphite|NMC622 cells with different electrolytes from 4.4 V to 4.9 V.

FIG. 6 is a graph of voltage holds of graphite|NMC622 cells with different electrolytes at voltages of 4.4 V to 4.9 V. One of the advantages of fluorination is high oxidation stability. To compare the stability of electrolytes, voltage holding tests of NMC622/graphite cells with different electrolytes were conducted with a voltage step from 4.4 V to 4.9 V, with 10 hour holds at each step. The cell with Gen 2 electrolyte sustained a low current up to 4.8 V, and the current started slightly increasing at 4.9 V. In contrast, the cell using EA electrolyte started showing a leakage current above 4.6 V and the current increased dramatically at 4.9 V. The cells using EA-f and EA-f with LiDFOB electrolytes maintained low leakage currents up to 4.9 V, indicating their high oxidation stability. These results imply the possible application of EA-f electrolytes at high voltage operation.

Figure 7:
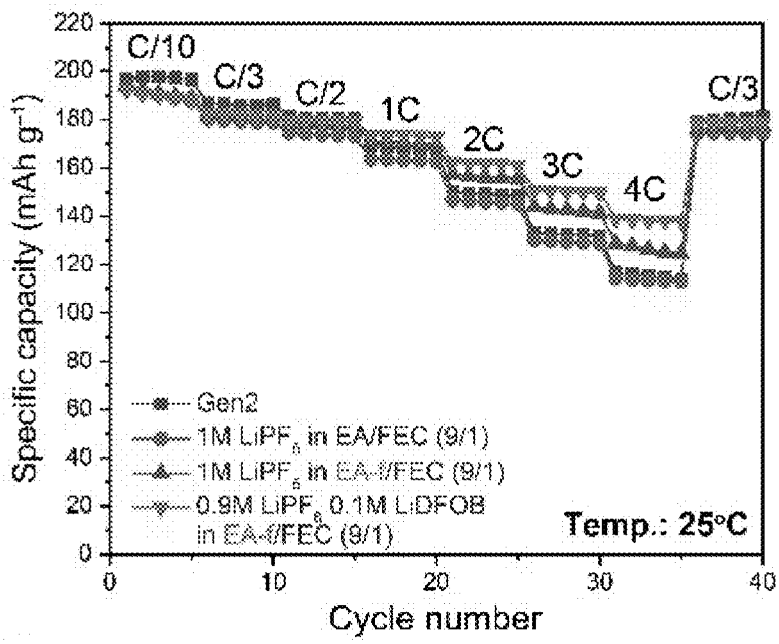
FIG. 7 is a graph of C-rate capability of graphite|NMC622 cells with different electrolytes operated at 25° C.

FIG. 7 is a graph of C-rate capability of graphite|NMC622 cells with different electrolytes operated at 25° C. Various C-rates were applied from C/10 to 4C. As shown in FIG. 7, at 25° C. and at 4C, Gen2 and EA electrolytes showed similar capacities of 116 mAh $g^{-1}$ and 113 mAh $g^{-1}$, respectively. In contrast, EA-f with LiDFOB electrolyte showed a better rate capability with a capacity of 138 mAh $g^{-1}$ at 4C.

Figure 8:
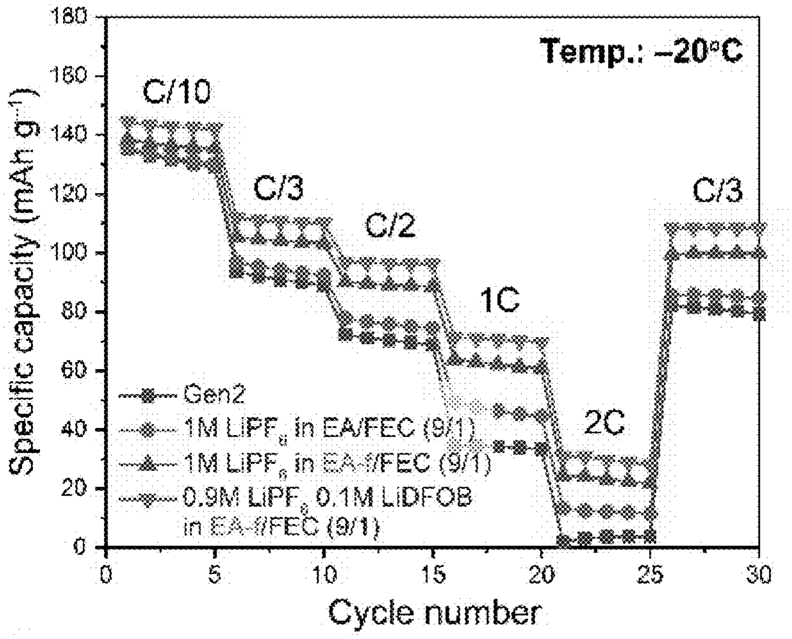
FIG. 8 is a graph of C-rate capability of graphite|NMC622 cells with different electrolytes operated at −20° C.

FIG. 8 is a graph of C-rate capability of graphite|NMC622 cells with different electrolytes operated at −20° C. Various C-rates were applied from C/10 to 4C. As shown in FIG. 8, at a low temperature of −20° C., the difference in rate capability between the electrolytes diverged. At a current of 1C at −20° C., Gen 2 only exhibited a capacity of 33 mAh $g^{-1}$. In contrast, EA-f electrolyte with LiDFOB additive still maintained a high capacity of 70 mAh $g^{-1}$ under the same conditions. The f-EA electrolyte exhibited poor performance. These results may indicate a trade-off between the weak solvation structure and electrochemical performance of different EA electrolytes. Furthermore, EA-f electrolytes were used in Li metal batteries, showing high capacity retention at both temperatures of 25° C. and −20° C. at various C-rates.

Figure 9:
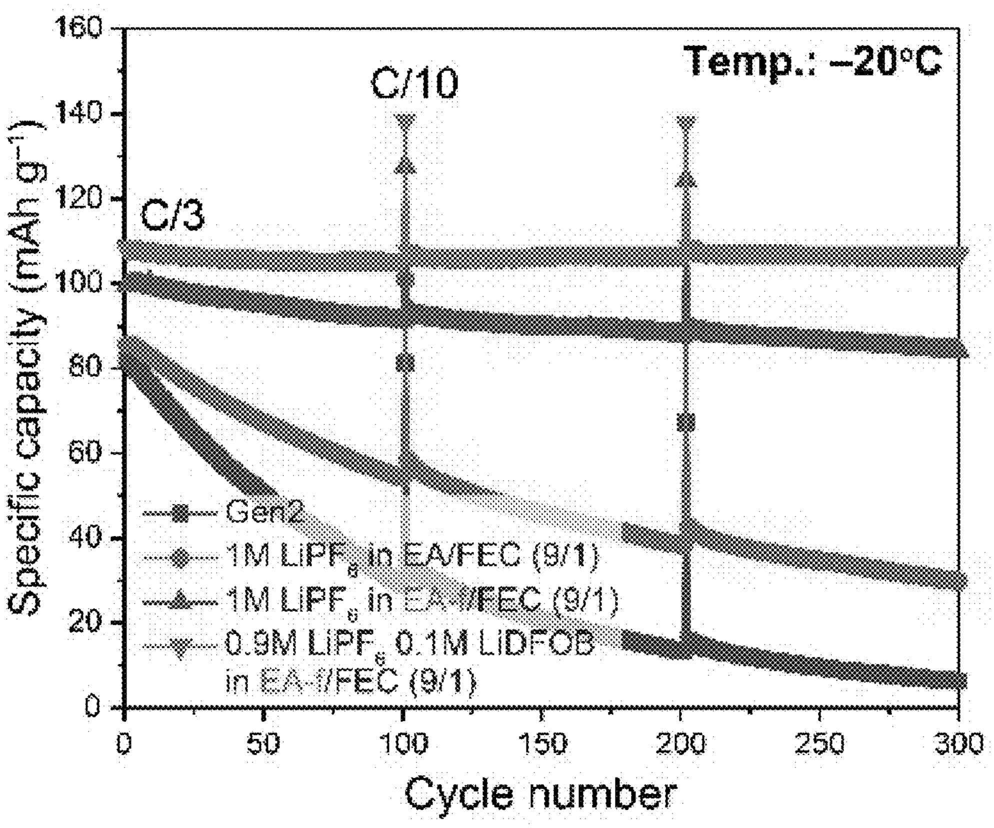
FIG. 9 is a graph of cyclability of graphite|NMC622 cells with different electrolytes operated at −20° C.

FIG. 9 is a graph of cyclability of graphite|NMC622 cells with different electrolytes operated at −20° C. Long-term cyclability at high C-rates and low temperatures is considered a challenging aspect in lithium-ion batteries. When a current of C/3 was applied at −20° C., cells with Gen 2 and EA electrolytes showed a severe capacity loss to a retention of 7.5% and 34%, respectively, after 300 cycles. In contrast, EA-f with LiDFOB electrolyte showed a negligible capacity loss and retained 97% capacity after 300 cycles. This cycling test result indicated the stability of the EA-f with LiDFOB electrolyte for low temperature operation, even at higher charging rates.

Additional long-term cycling tests were conducted under various conditions. At a current of 2C at 25° C., EA electrolyte gradually decayed to a capacity retention of 73% after 400 cycles. In contrast, EA-f with LiDFOB electrolyte showed a higher capacity retention of 91% after 400 cycles.

Cyclability tests were also conducted at a high current of 6C. Under these conditions, Gen 2 was rapidly degraded and the electrochemical cell with Gen 2 electrolyte had a capacity retention of 34% at 50 cycles. In contrast, EA-f with LiDFOB electrolyte showed a higher capacity retention of 85% after 500 cycles.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A method of cycling an electrochemical cell, the method comprising:

operating the electrochemical cell at a temperature of about −40° C. to about —20° C.;

wherein operating comprises the electrochemical cell having a capacity retention of at least 90% over 300 electrochemical cycles;

wherein an electrolyte in the electrochemical cell comprises:

a metal fluorophosphate salt, fluorinated cyclic carbonate, a solid electrolyte interphase (SEI)-forming additive salt, where the SEI is a layer of material that forms between the anode and the electrolyte produced by breakdown of electrolyte compounds during electrochemical operation of the electrochemical cell, a fluorinated compound represented by Formula I, Formula II, Formula III, Formula IV, or a mixture of any two or more thereof:

Formula I

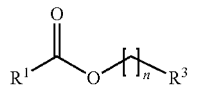

Formula II

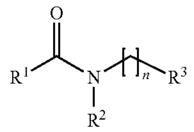

Formula III

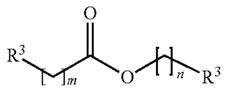

Formula IV

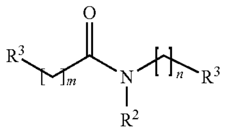

wherein:

$R^1$ is a C1-C6 alkyl group;

$R^2$ is a C1-C6 alkyl group;

$R^3$ is F or a fluorinated C1-C5 alkyl group;

m is 1, 2, 3, or 4; and n is 1, 2, 3, or 4.

2. The method of claim 1, wherein the electrochemical cell is a lithium secondary battery, the metal fluorophosphate salt is a lithium hexafluorophosphate salt, and the SEI-forming additive salt is lithium difluoro(oxalato)borate (LiDFOB) salt.

3. The method of claim 2, wherein:

the lithium secondary battery comprises an anode comprising graphite and a cathode comprising $LiNi_{0.6}Mn_{0.2}Co_{0.2}O_2$ (NMC622); and operating the lithium secondary battery comprises charging and discharging the lithium secondary battery at a current of C/3 in a voltage window of 2.7 V vs $Li/Li^+$ to 4.4 V vs $Li/Li^+$.

4. The method of claim 1, wherein the fluorinated cyclic carbonate is present in the electrolyte in a concentration of about 3% v/v to about 20% v/v.

5. The method of claim 1, wherein the SEI-forming additive salt is present in the electrolyte in a concentration of about 0.03 M to about 0.2 M.

6. The method of claim 1, wherein the fluorinated compound is represented by Formula V, VI, VII, or a mixture of any two or more thereof:

Formula V

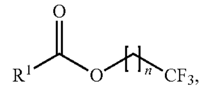

Formula VI

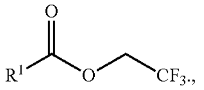

or

Formula VII

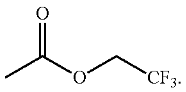

7. The method of claim 1, wherein the fluorinated cyclic carbonate is 4-fluoro-1,3-dioxolan-2-one (FEC).

8. The method of claim 1, wherein the SEI-forming additive salt is difluoro(oxalato)borate (DFOB) salt.

* * * * *